United States Patent [19]

Stollorz

[11] 4,359,762
[45] Nov. 16, 1982

[54] REMOVABLE STORAGE MODULE AND MODULE

[76] Inventor: Herbert R. Stollorz, 77 Mercedes La., Atherton, Calif. 94025

[21] Appl. No.: 149,329

[22] Filed: May 13, 1980

[51] Int. Cl.³ .................. G11B 5/012; G11B 23/02
[52] U.S. Cl. ........................................ 360/98; 360/133
[58] Field of Search ...................... 360/97–99, 360/106, 133

[56] References Cited

U.S. PATENT DOCUMENTS

| 3,786,454 | 1/1974 | Lissner et al. | 360/98 |
| 3,797,033 | 3/1974 | Prieur | 360/98 |
| 3,800,325 | 3/1974 | O'Brien | 360/98 |
| 3,843,967 | 10/1974 | Mulvany | 360/98 |
| 3,893,178 | 7/1975 | Sordello | 360/98 X |
| 4,034,411 | 7/1977 | Kraemer et al. | 360/98 |

FOREIGN PATENT DOCUMENTS

| 14231 | 8/1980 | European Pat. Off. | 360/98 |
| 54-113309 | 9/1979 | Japan | 360/98 |

OTHER PUBLICATIONS

IBM/TDB, vol. 12, No. 5, Oct. 1969, p. 687, "Magnetic Disk Storage", by Bahr et al.

Primary Examiner—John H. Wolff
Attorney, Agent, or Firm—Paul F. Schenck

[57] ABSTRACT

A storage module drive with motor, actuator and electronic interface circuit has provisions to receive one or more storage modules. A storage module includes in an enclosure a storage disk, transducers and coupling means to link the storage disk to the motor in the module drive.

9 Claims, 30 Drawing Figures

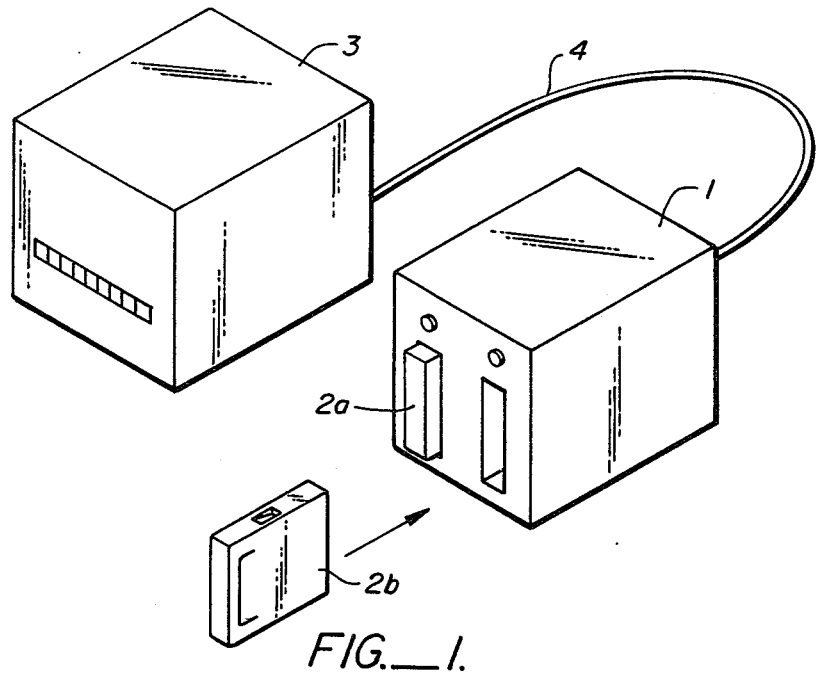
FIG._1.
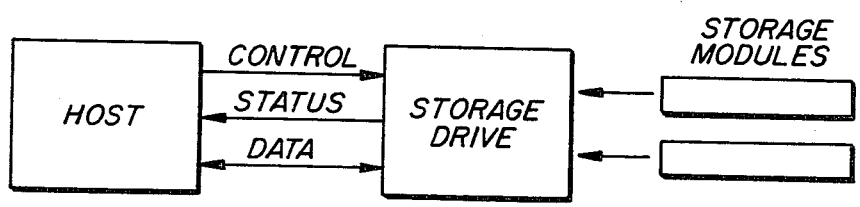
FIG._2.
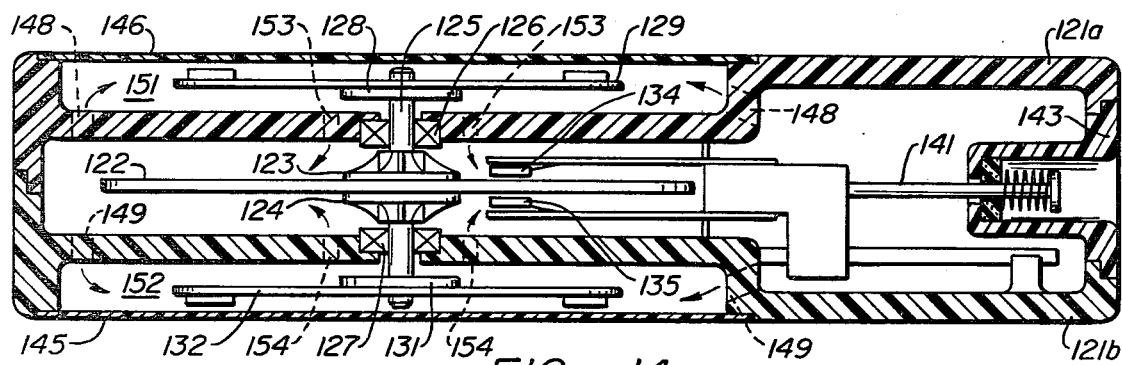
FIG._14.

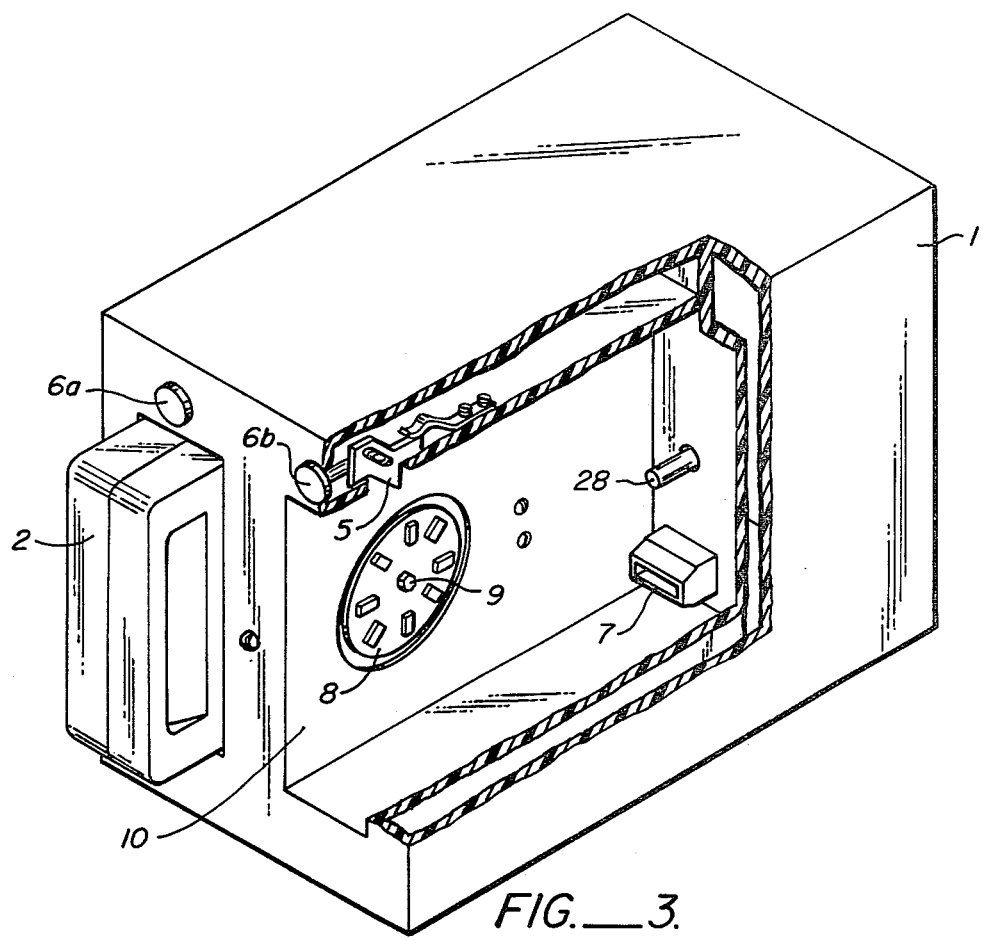
FIG.___3.
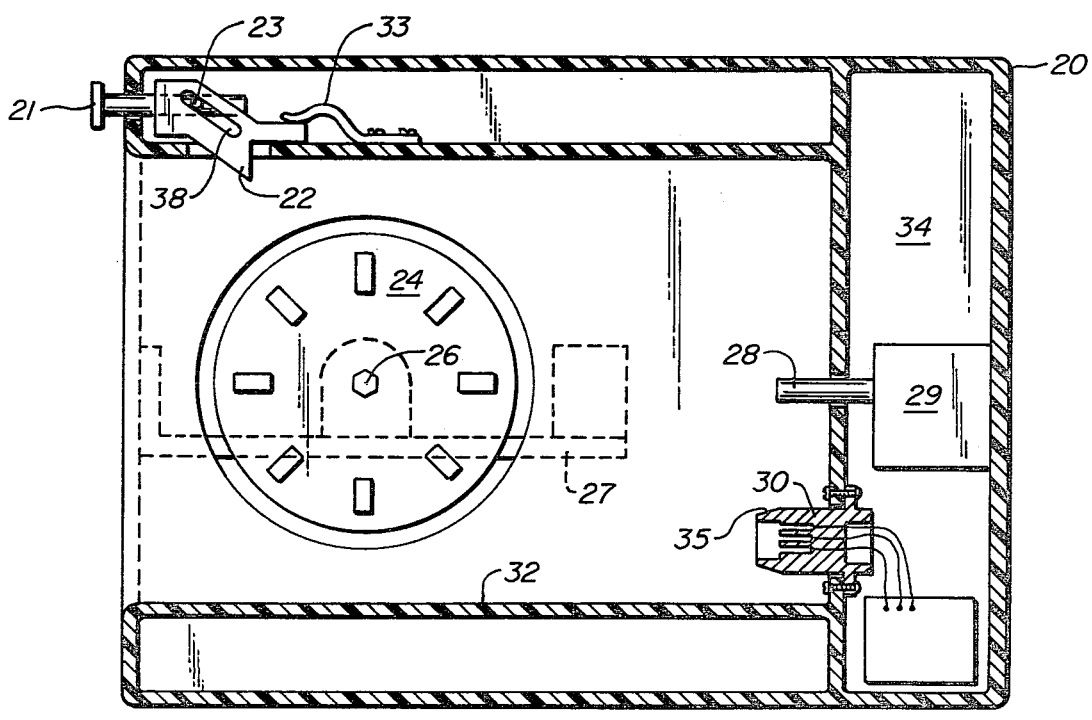
FIG.___5.

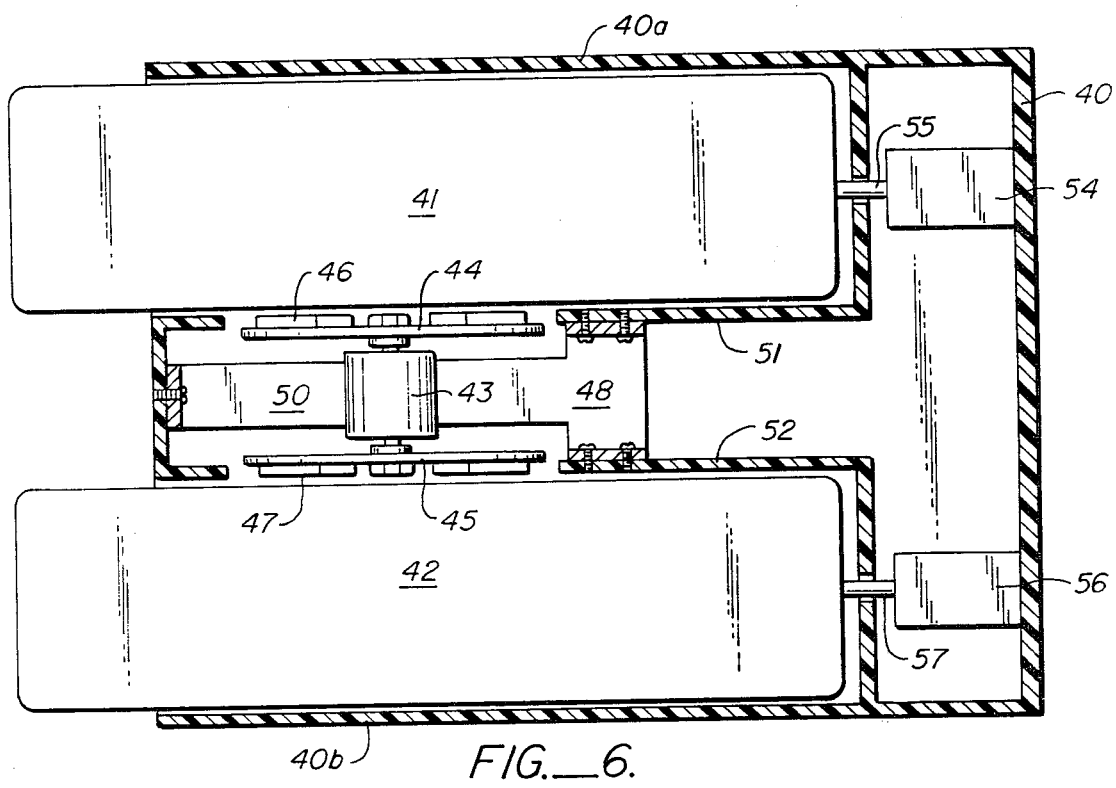
FIG.—6.
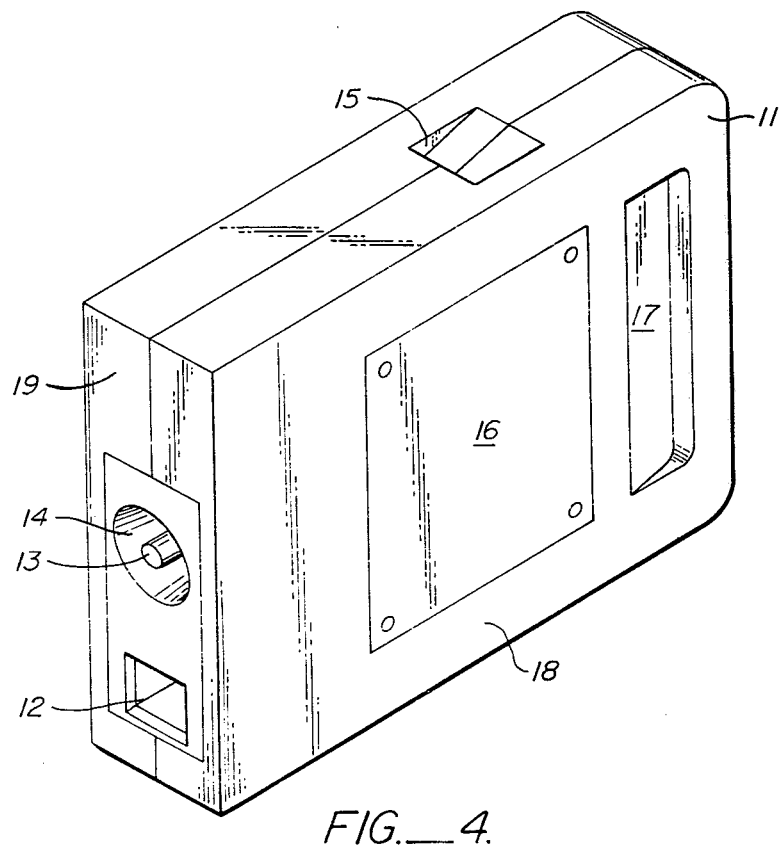
FIG.—4.

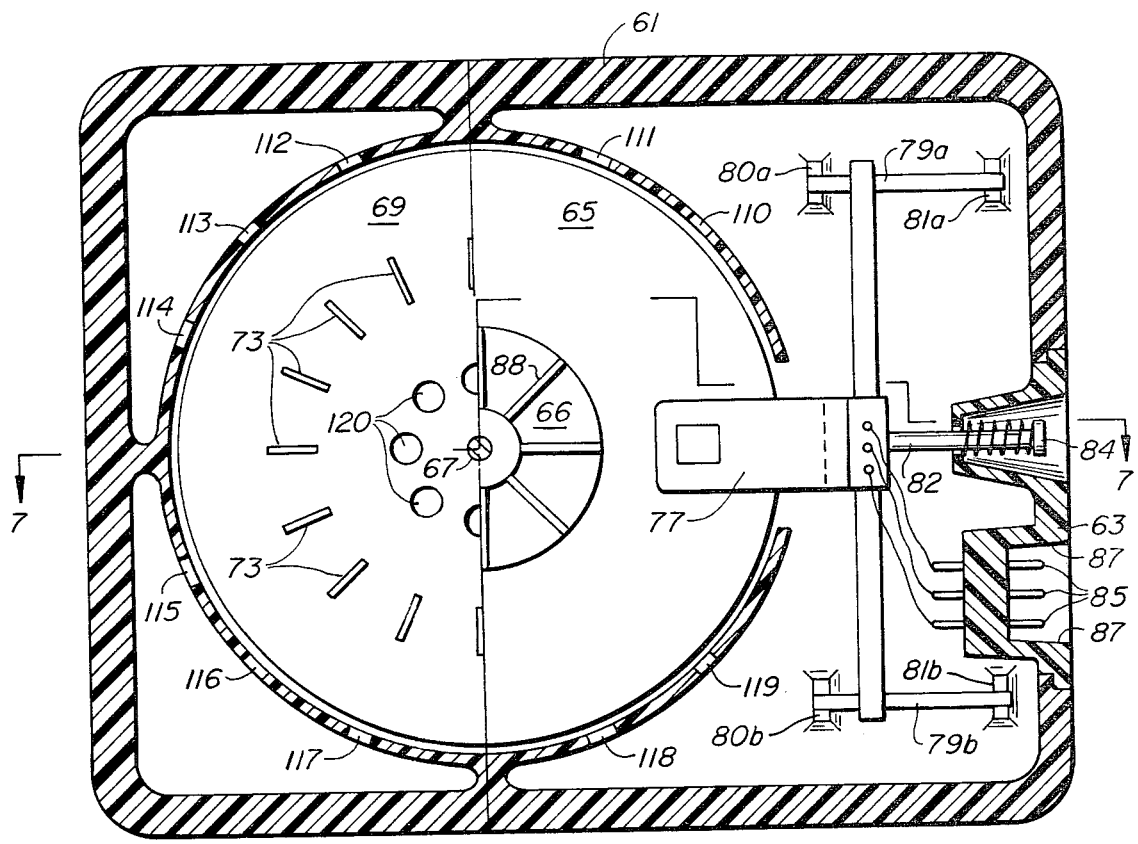
FIG._8.
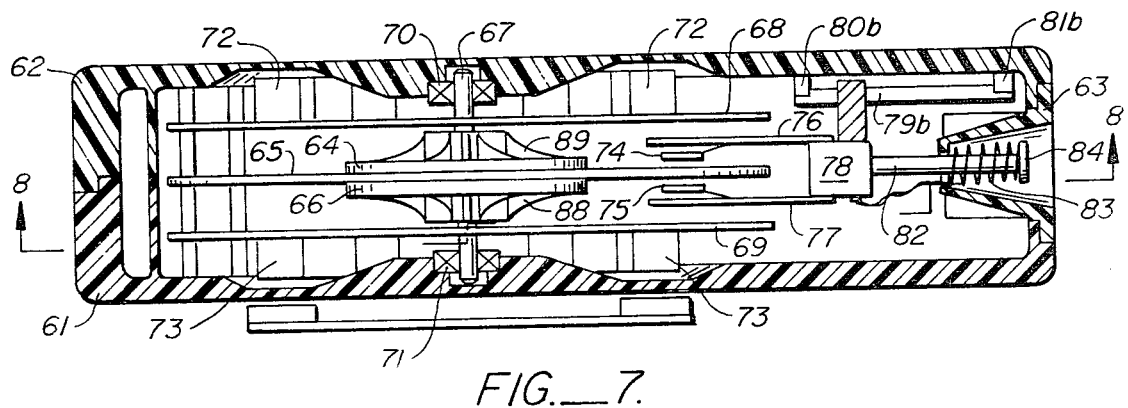
FIG._7.

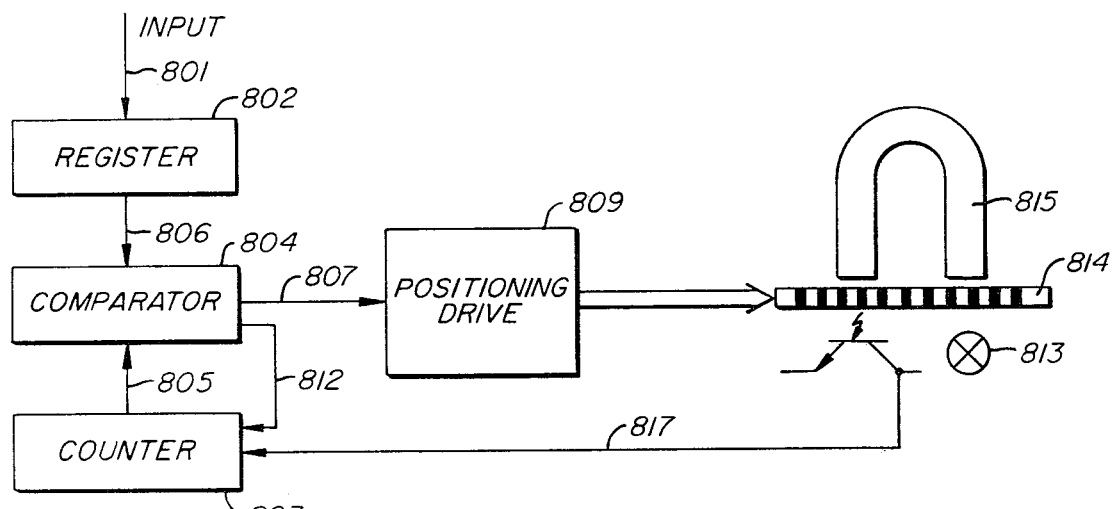
FIG._9.

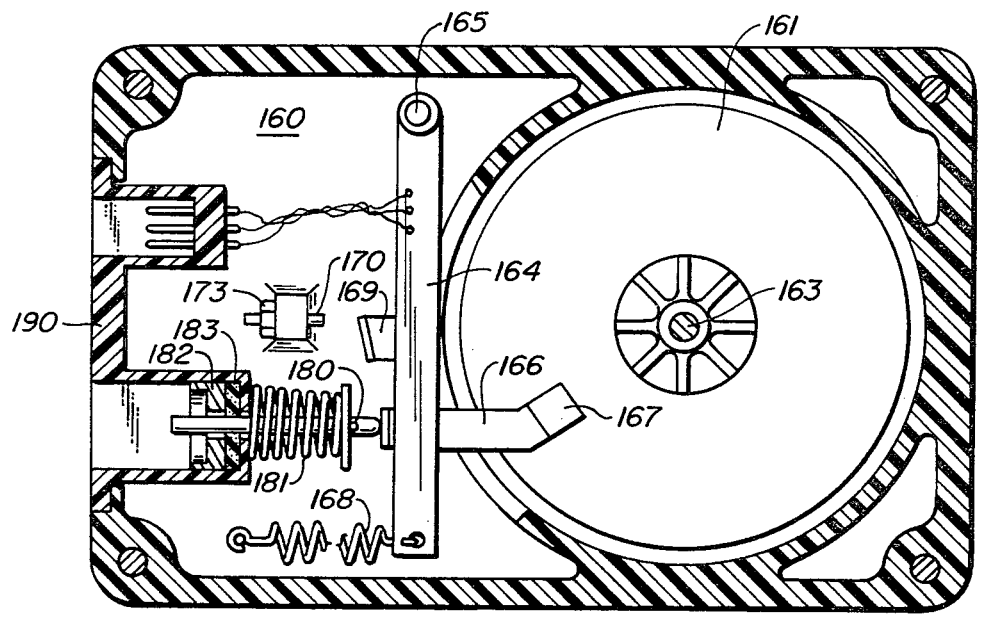
FIG._10.
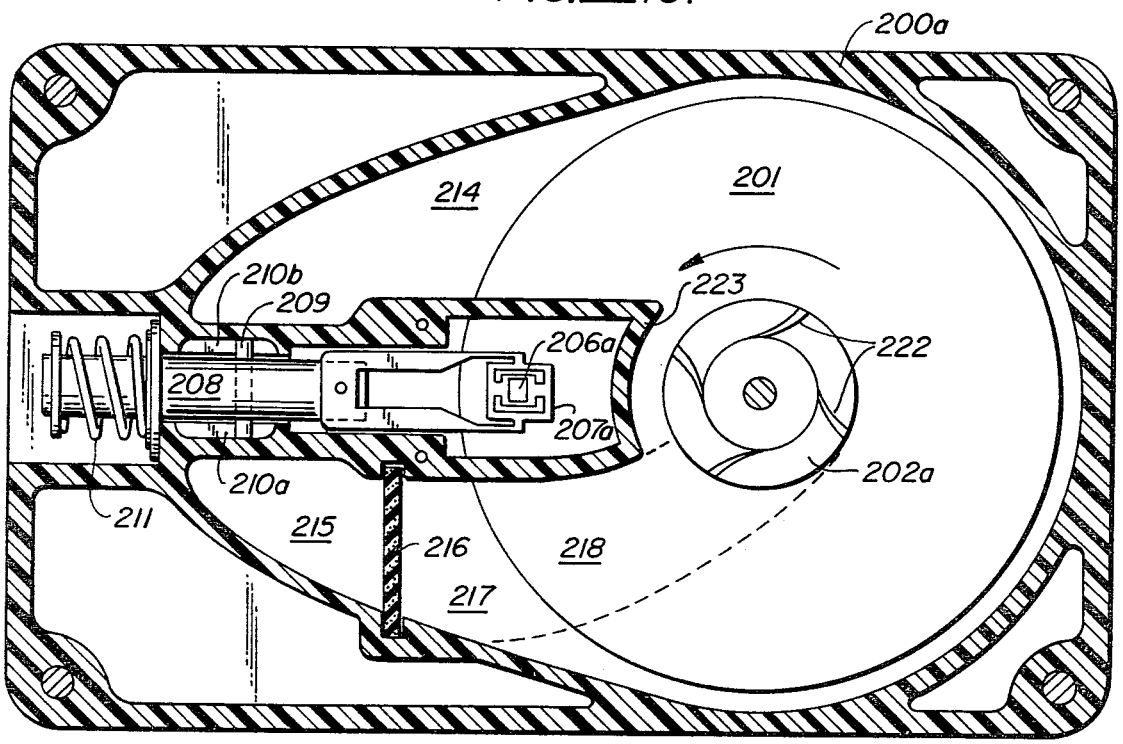
FIG._12.
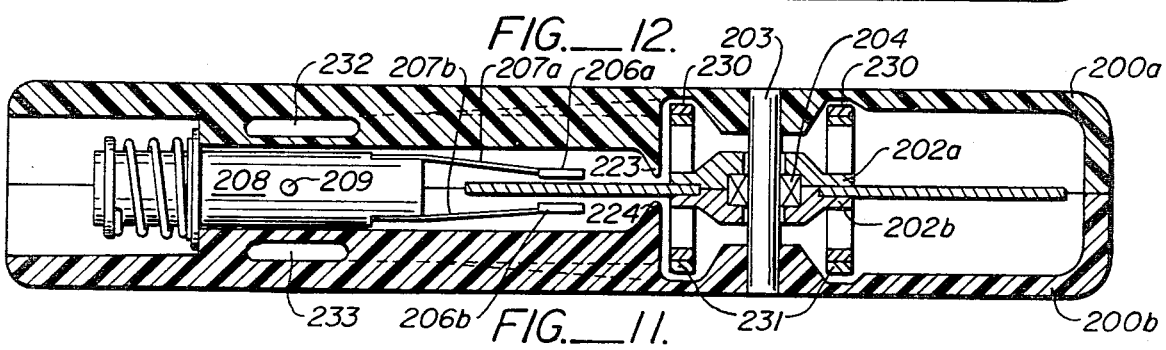
FIG._11.

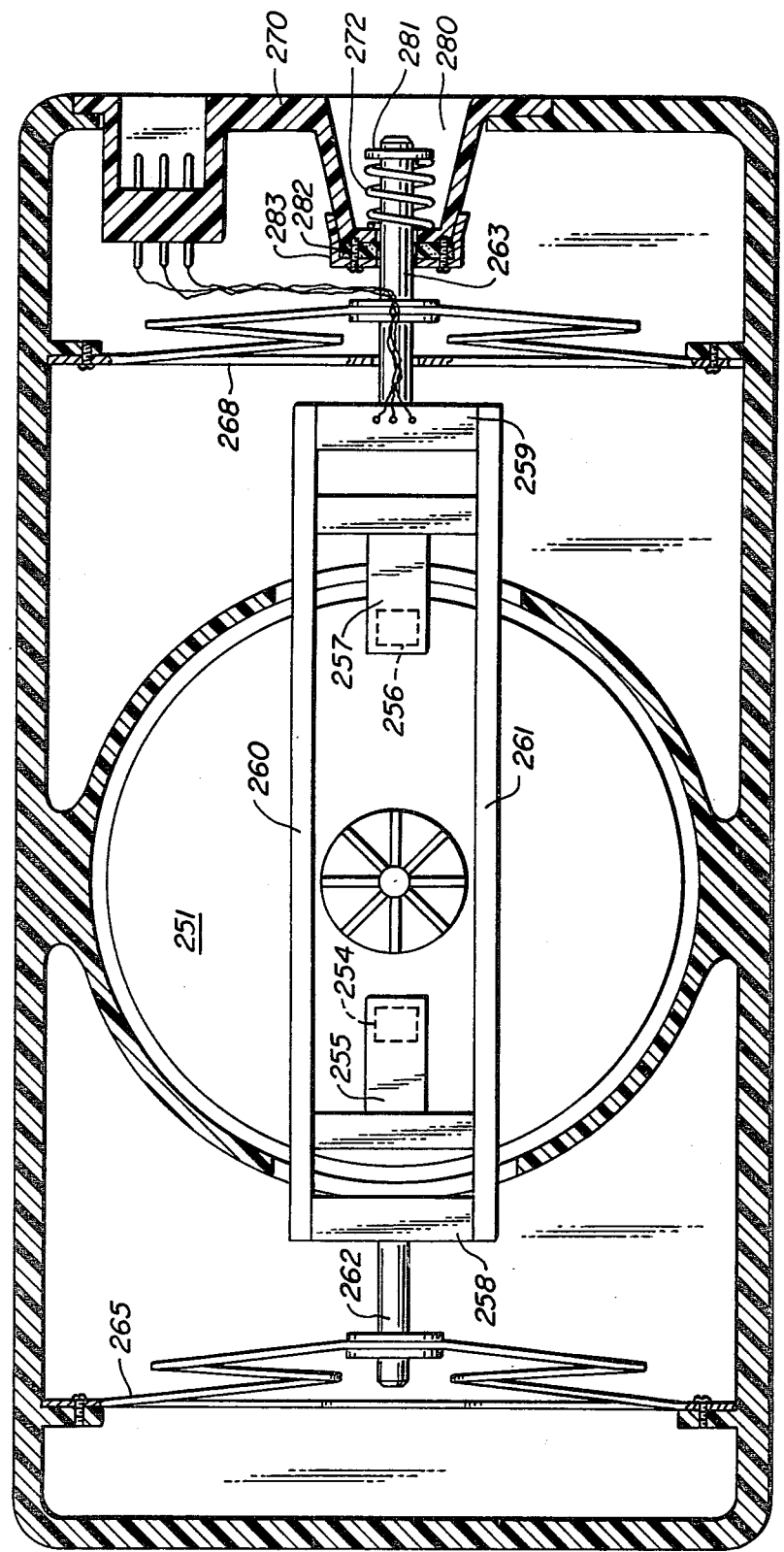
FIG._13a.

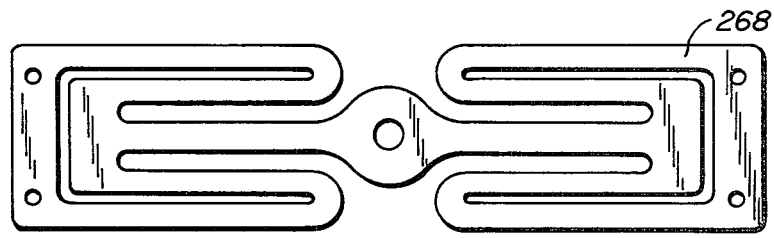
FIG.__13b.
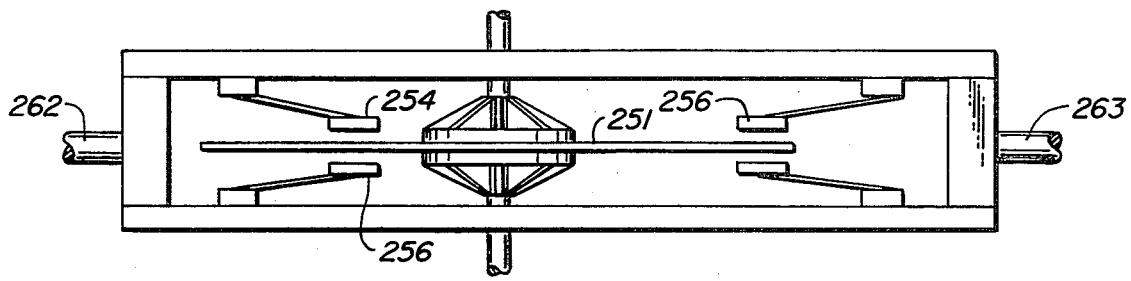
FIG.__13c.
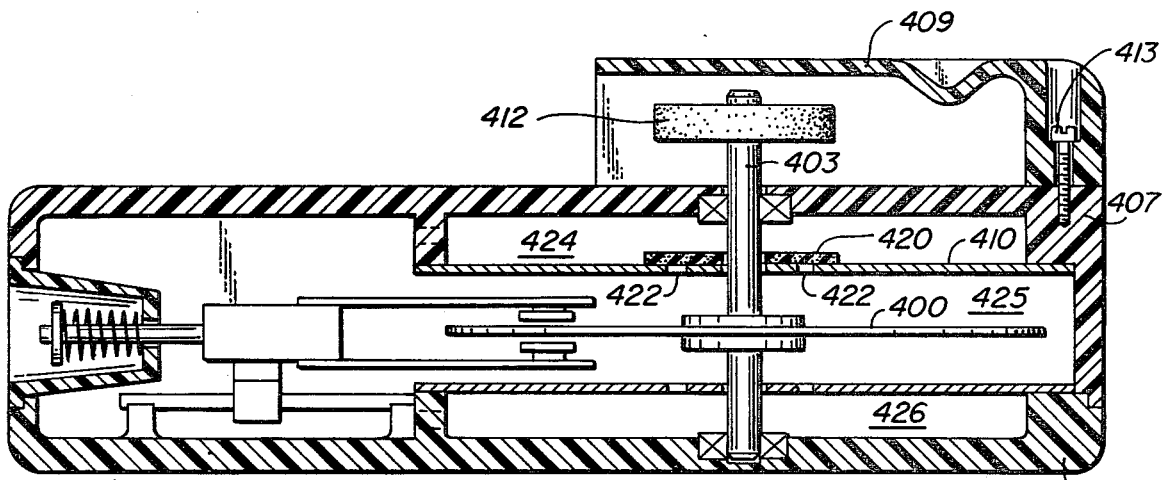
FIG.__15.
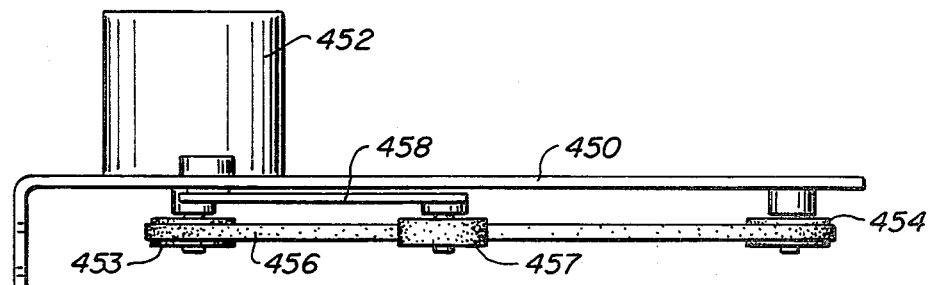
FIG.__17.

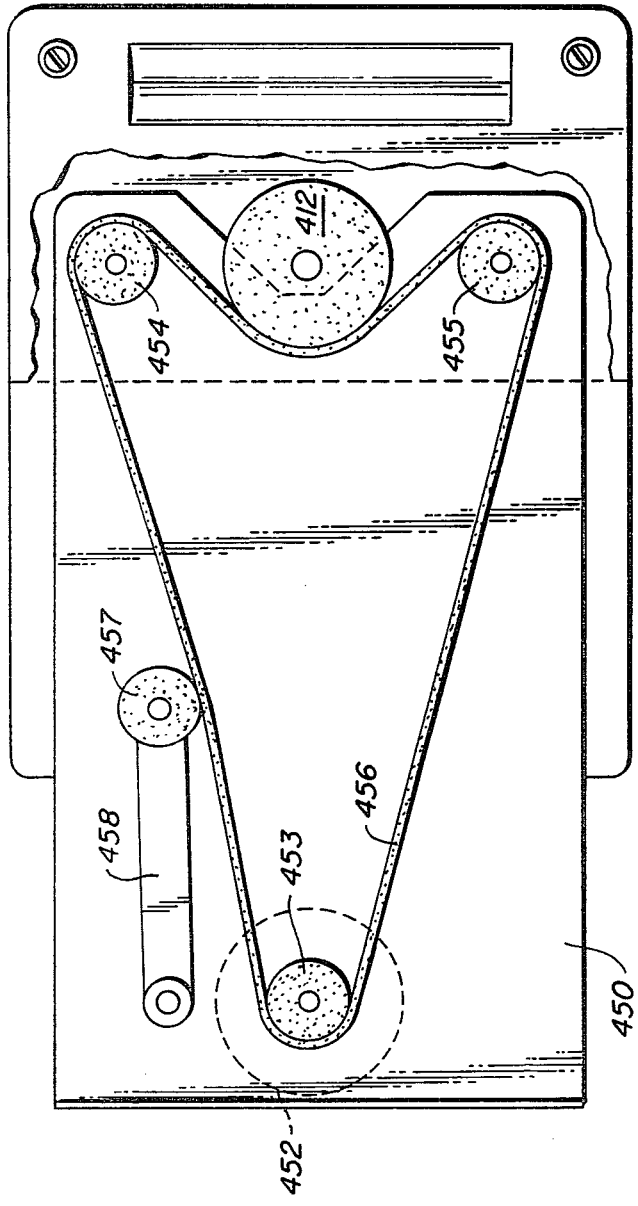
FIG._16.
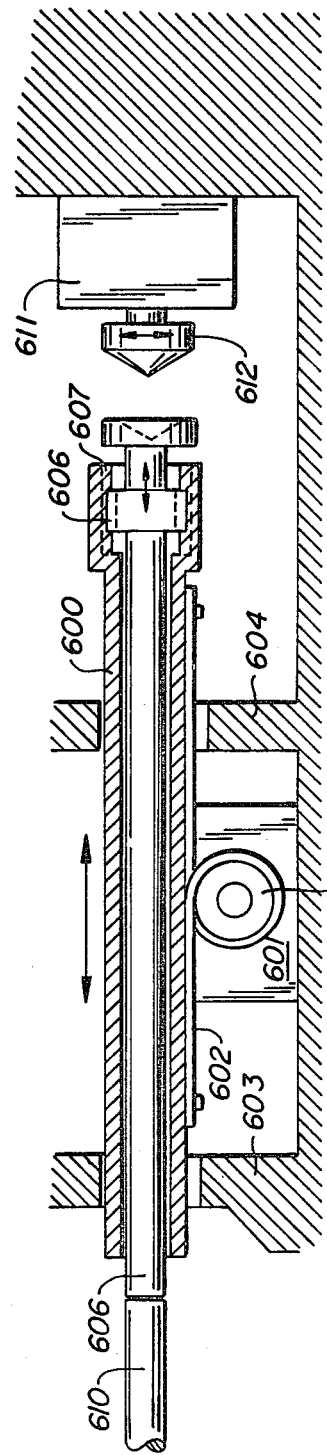
FIG._20.

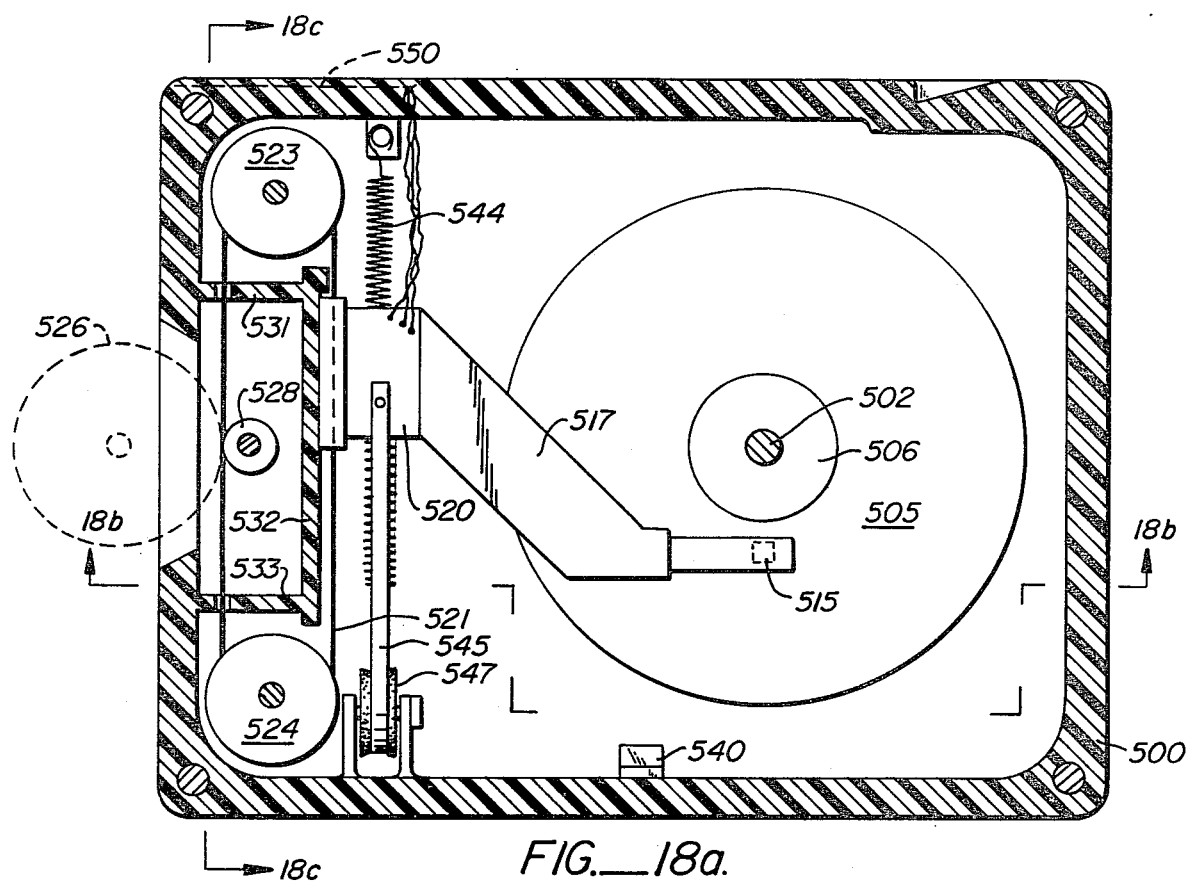
FIG._18a.
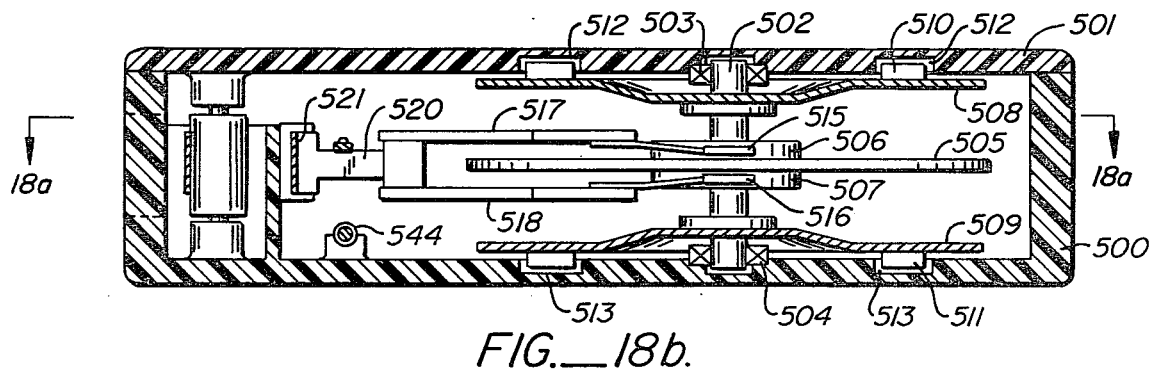
FIG._18b.
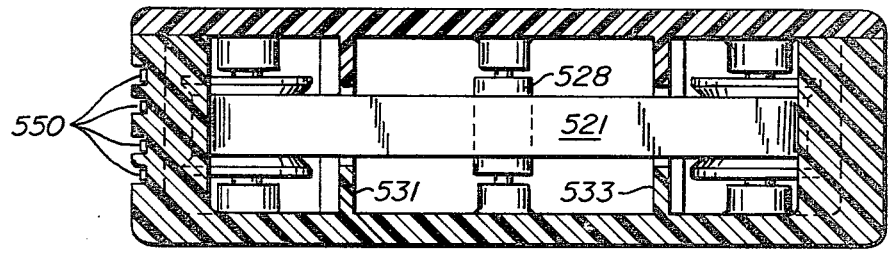
FIG._18c.

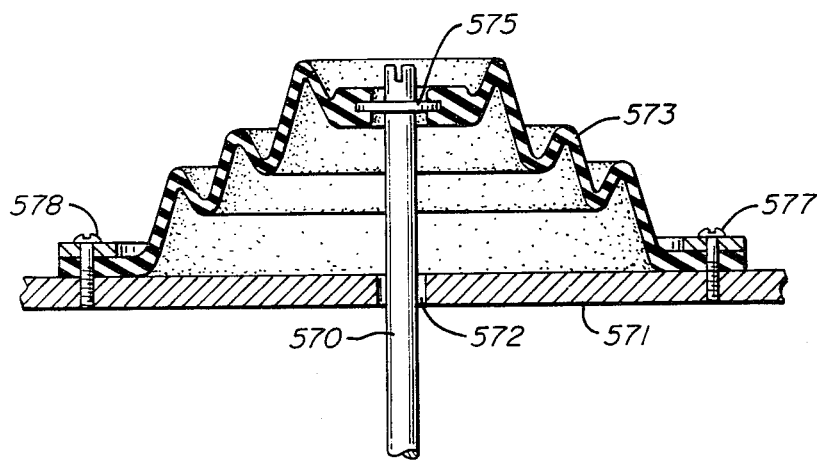
FIG._19.
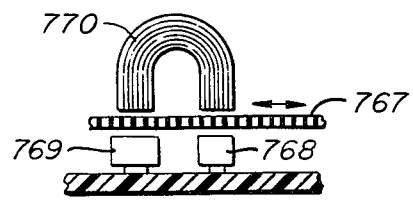
FIG._22a.
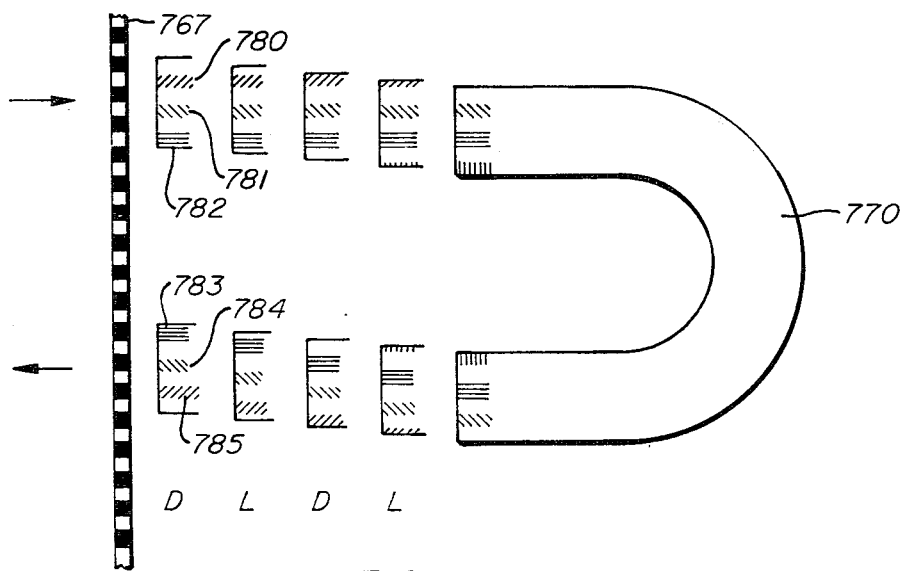
FIG._22b.

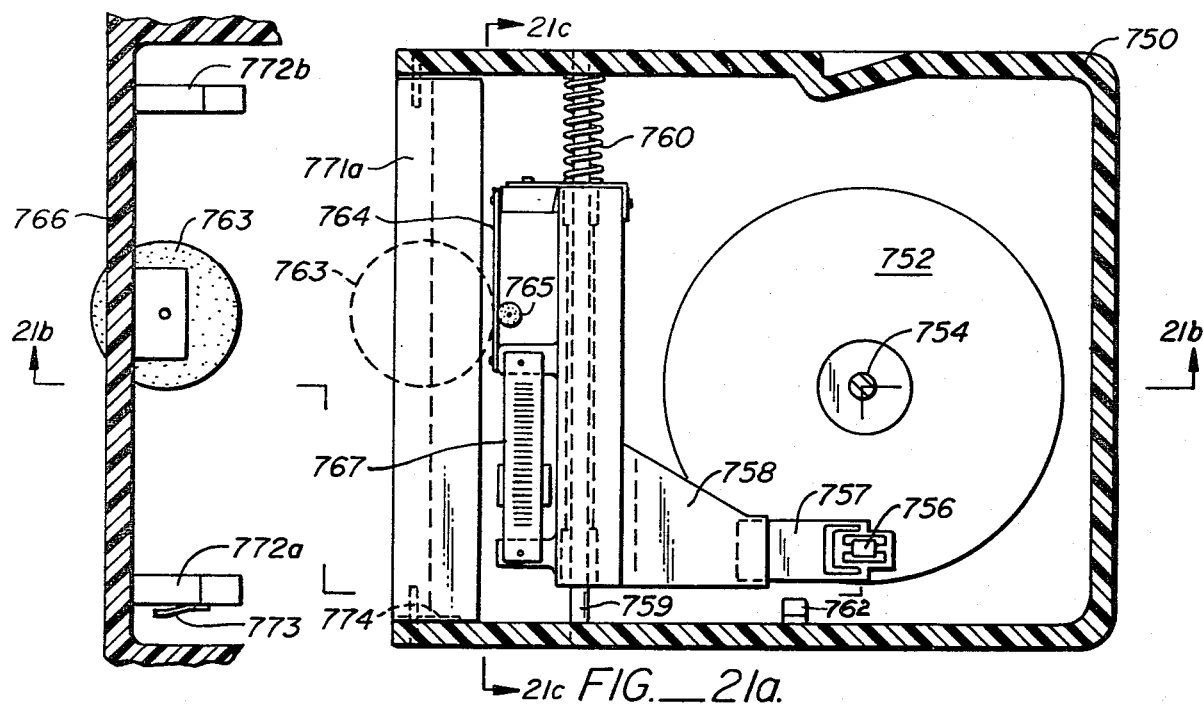
FIG.__21a.
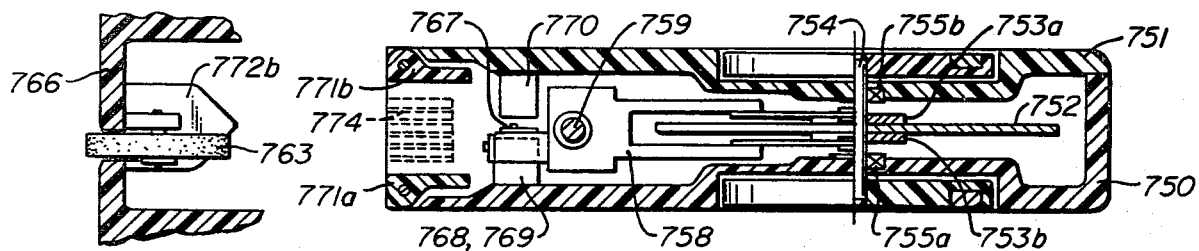
FIG.__21b.
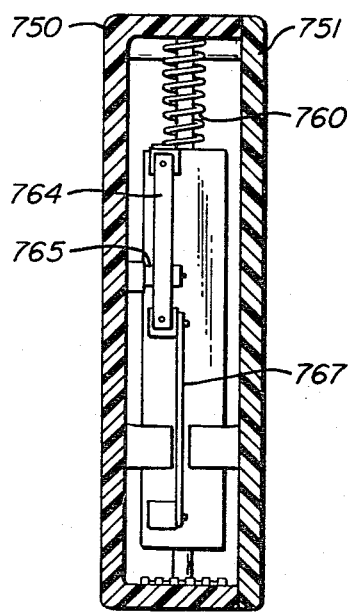
FIG.__21c.

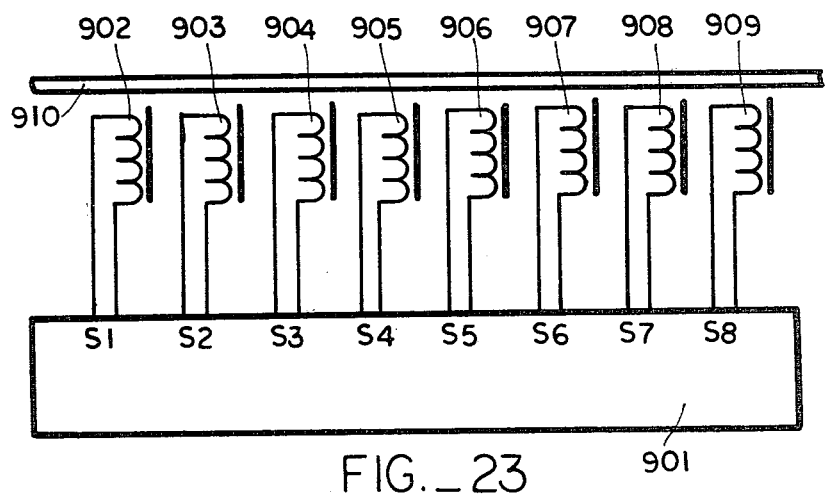
FIG._23

REMOVABLE STORAGE MODULE AND MODULE

BACKGROUND OF THE INVENTION

Mass memory is a major component in any data processing or data handling system. Mass memory is characterized by size in total storage capacity in words, by access time to a certain amount of data, by storage efficiency in storage capacity per volume, by cost in cents per word stored, and by removability of the storage medium.

Advancements in small business computers and word processing systems generated a need for exchangeable data storage devices. The diskette storage assumed the role of an exchangeable, low cost data storage. However, storage capacity and data safety is limited with these type of storages. Therefore, diskette-type devices do not qualify as mass-memory for central processors. Central processors have shrunk in size significantly in recent years. Mass memory, however, remained a bulky device.

The storage module of the present invention combines easy exchangeability of a diskette-like device with the capacity and data safety of a mega-byte storage device.

BRIEF SUMMARY OF THE INVENTION

The present invention provides for an arrangement of a storage drive unit, which can be adapted for rack-mounting, and exchangeable storage modules. High recording density in bits/inch and tracks/inch are achieved by use of low-flying transducer heads. It is intended to record with a density of 16 kilo-bits/inch in the storage tracks, and to package tracks in a space of 0.001 inches. A double-sided storage disk with 256 tracks per surface offers a total storage capacity of 5 Mega-bits. At 1800 RPM the average latency time will be about 17 msec.

The cost of a storage module ist kept low by simplifying the transducer support means and by mounting the actuator and the drive motor in the module drive unit. The enclosure of the storage module is dustproof. A new method of interfacing the actuator with the transducer support arm is presented. A new method of coupling the storage disk to the motor in the drive unit ensures a clean environment for the storage disk and the transducer heads.

The basic preferred embodiment and several variations of major components of the storage module are presented in the specification.

OBJECT OF THE INVENTION

It is an object of this invention to provide a low cost mass memory storage module.

It is another object of this invention to introduce an new type of removable storage module.

It is another object of this invention to present a removeable storage module with a magnetic, friction-free coupling between drive motor in the storage drive module and storage disk.

It is still another object of this invention to introduce a removeable dustproof sealed storage module, for use with the storage drive module.

It is still another object of this invention to introduce a storage drive for multiple disk storage modules with movable transducer heads.

BRIEF DESCRIPTION OF THE DRAWINGS

FIG. 1 is a schematic illustration of the user environment of the storage device.

FIG. 2 is a schematic illustration of the basic interface between host device and storage device.

FIG. 3 is a schematic perspective illustration of a storage drive for two removable storage modules, one storage module inserted in the left position.

FIG. 4 is a perspective view of a storage module with magnetic coupling.

FIG. 5 is a vertical cross-sectional view if a receiving slot of the storage drive.

FIG. 6 is a cross-sectional view of the storage drive of the present invention with two storage module inserted.

FIG. 7 is a cross-sectional illustration of a storage module having a magnetic coupling and linear motion transducer arm.

FIG. 8 is a cross-sectional view of the storage module shown in FIG. 7.

FIG. 9 is a schematic diagram of a control arrangement for the positioning of transducers in a storage module.

FIG. 10 is a cross-sectional illustration of a storage module with angular movement of the transducer support arm.

FIGS. 11 and 12 are cross-sectional views of a storage drive with transducers mounted on the positioning pushrod.

FIGS. 13a, 13b and 13c are illustrations of still another storage module, having a transducer support arm with dual set of transducers and flexure support.

FIG. 14 is a cross-sectional view of still another storage module of the present invention.

FIG. 15 is a cross-sectional illustration of still another storage module, using friction coupling between the shaft of the storage disk and the drive motor in the storage drive.

FIGS. 16 and 17 are illustrations of a drive unit for storage modules with friction coupling.

FIGS. 18a, 18b, and 18c are cross-sectional illustrations of still another storage module, having a friction wheel, drive belt interface for the positioning of the transducer support arm.

FIG. 19 is an illustration of a dust seal for the transducer arm pushrod.

FIG. 20 is an illustration of an actuator with controllable arm extension to adjust for tolerances in the storage module/module drive interface.

FIGS. 21a, 21b, and 21c are cross-sectional illustrations of a storage module using a friction type interface between actuator in the storage drive and the band-driven transducer support means.

FIGS. 22a and 22b are illustrations of the optical positioning control means used in the storage module of FIGS. 21a through 21c.

FIG. 23 is a schematic diagram of a multiphase oscillator and a stationary primary coupling.

DESCRIPTION OF THE PREFERRED EMBODYMENTS

The present invention relates to a storage module and the drive for interfacing the storage module with a data handling device, such as a computer. The drive includes special mechanical and electrical components required to perform special tasks on the storage module under control of signals issued by the data handling device. In the present invention the storage module is a storage device for data, which can be removed from the drive. The storage module of the present invention includes a storage disk and transducer means for reading or writing data on the storage disk. A simplified method of driving the storage disk reduces the cost of the storage module and the cost for storing data.

In FIG. 1 the storage drive is shown in one of the many operating environments it may be used. Storage module drive 1 may receive either one or both of the storage modules 2a and 2b for reading or writing data on the storage disk contained in the storage module. The storage module drive 1 is controlled by a host unit 3, which may be a minicomputer, full-sized computer, a special purpose data gathering and/or retrieval device, or any other instrument which is capable to issue suitable control signals to the drive unit, receive status signals and exchange data signals with the drive unit 1 via cable link 4. Control signals issued by the host unit 3 include signals specifying the address of storage locations, and the operations to be executed, such as reading data, or writing data. Status signals include signals reporting the readines of the drive unit 1 and error conditions.

FIG. 2 is a schematic illustration of the electronic signal interface between the host unit and the drive unit. The host unit issues control signals to prepare the storage drive unit for a task. The storage drive unit issues status signals to identify its operational conditions to the host. During a write operation the host sends signals representing data to the drive unit for storage in a storage module. During a read operation the host receives signals representing data from the storage drive unit, which retrieved these data from a storage module.

FIG. 3 is a schematic illustration of a storage module with two slots for receiving storage modules. Module drive 1 has one storage module 2 inserted in the left slot, while the right slot 10 is empty. Pushbuttons 6a and 6b are provided to release a previously loaded storage module. Major components interfacing module drive 1 with a storage module are shown for the right slot 10. A storage module is locked in place by a lever 5, which catches into a recess of the storage module (see recess 15 in FIG. 4). The storage disk inside the storage module is driven by a motor located in the module drive. Connection is made via the coupling disk 8 mounted on shaft 9. The transducers for reading or writing data on the storage disk are positioned by the positioning shaft 28 of an actuator located in the module drive. The electrical connection between the electronic means in the module drive 1 and the transducers in the storage module is established with connector 7.

While sliding a storage module, such as storage module 2, into a receiving slot, the module is aligned with the coupling disk 8, the positioning shaft 28, and the connector 7. When properly seated lever 5 will latch into the locking recess of the storage module. A storage module positioned in a receiving slot is released by operating release button 6a or 6b.

FIG. 4 is a perspective view of a storage module 11, showing the top side with the locking recess 15. The side wall 18 includes the coverplate 16 for the secondary coupling disk in the storage module and a recess 17 for easing handling of the module 11. The rearside 19 of the storage module 11 includes the pushrod 13 located in a recess 14. Pushrod 13 interfaces with the positioning shaft 38 of the module drive 1. A connector 12 interfaces with a connector 7 in the module drive 1 for transferring electrical signals between module drive 1 and storage module 11.

FIG. 5 is a cross-sectional view of a receiving slot of a storage drive 20. A storage module inserted in the slot rests on the floor 32. During the loading of the storage module into the slot from the left side in FIG. 5, the connector 30 with its slanted sides 35 aligns the module for proper match of connector 30 with connector 12 of the module, and for proper alignment between positioning shaft 28 and pushrod 13. Lever 22 falls into recess 15. The latching occurs when the coupling disk in the storage module is aligned with the coupling disk 24 of module drive 20. Primary coupling disk 24 is mounted on shaft 26, which is properly positioned in the module drive by support means 27 (see FIG. 6). Actuator 29 and the required electronic means are located in the rear section 34 of module drive 20. Lever 22 is mounted on support shaft 23 and held in the lower position by spring 33. Push button 21 when operated forces lever 22 to turn upward while pin 37 is gliding in slot 38.

FIG. 6 is another cross-sectional view of the module drive 40, showing two storage modules 41 and 42 positioned in module drive 40. Storage module 41 is positioned in the left slot between outside wall 40a and inside wall 51. Storage module 42 is positioned in the right slot between outside wall 40b an inside wall 52. The space between inside walls 51 and 52 is occupied by drive motor 43, which is mounted on support means 48 and 50, positioning the two primary coupling disks properly relative to the storage modules 41 and 42. Primary coupling disks 44 and 45 are of the magnetic type, and are shown in more detail on later FIGURES. A plurality of magnetic pieces 46 are attached to primary coupling disk 44. A plurality of magnetic pieces 47 are attached to primary coupling disk 45. Instead of the combination of motor and magnetic coupling disk a stationary circular arrangement of magnetic coils can be used. The magnetic coils are excited by a multiphase electrical signal, which generates a rotating magnetic field. This rotating magnetic field forces the coupling disk of a loaded storage module to rotate, following the rotating magnetic field. Actuator 54 and positioning shaft 55 position the transducer means in storage module 41. Actuator 56 and positioning shaft 57 position the transducer means in storage module 42.

FIGS. 7 and 8 are cross-sectional views of a storage module. Arrows "7" and linking "Z" shaped lines in FIG. 8 are indicative for the cross-sectional planes used for the view shown in FIG. 8. Arrows "8" and linking "Z" shaped lines in FIG. 7 are indicative for the cross-sectional planes used for the view shown in FIG. 7.

The storage module has an enclosure consisting of a first shell 61, a second shell 62 and a utility plate 63. Shell 61 carries bearings 70; shell 62 carries bearings 71. Bearings 70 and 71 support shaft 67. Storage disk 65 is mounted on shaft 67 between flanges 64 and 66. Two secondary coupling disks 68 and 69 are placed on shaft 67 on either side of storage disk 65. Secondary coupling disks 68 and 69 carry magnetic pieces 72, and 73, respectively. Either one of the two secondary coupling disks 68 and 69 may interface with a primary coupling disk in the module drive to rotate storage disk 65.

Data signals are read or recorded in tracks of storage disk 65 by transducer 74 for the upper side of storage disk 65, or transducer 75 for the lower side of storage disk 65. Transducer 74 is supported by arm 76; transducer 75 is supported by arm 77. Support arms 76 and 77 are connected to mounting block 78. Mounting block 78 is movably mounted on rails 79a and 79b. Rails 79a and 79b are placed on studs 80a and 81a, respectively 80b and 81b of enclosure shell 62. Moving block 78 allows to position transducers 74 and 75 over desired tracks on the upper and lower storage disk surface of disk 65. Movement of block 78 is effected by pushrod 82. As indicated relative to FIGS. 3 through 6, a pushrod of a storage module is operated by the positioning shaft and the actuator in the module drive. The positioning shaft applies a force on pushrod 82 and moves the transducers 74 and 75 towards the center of storage disk 65. Spring 83 in the recess of utility plate 63 applies a force on pushrod 82 for moving transducers 74 and 75 towards the periphery of storage disk 65. Therefore, positioning of transducers 74 and 75 is determined by the forces applied by the positioning shaft of the module drive and spring 83. Spring 83 is placed on pushrod 82 between the rearwall of the recess in utility plate 63 and a restraining plate 84 at the end of pushrod 82. Utility plate 63 provides an opening for pushrod 82 and includes the connector for electrical signals from and to transducers 74 and 75. The connector is represented here by three connector terminals 85. The recess of the connector includes slanted sides 87, which in combination with the connector 30 in the module drive position the storage module in the receiving slot of the module drive.

Flanges 64 and 66 have ribs 88 and 89, respectively, for enhancing the airstream across the surfaces of the storage disk 65. The air reaching the outside perimeter of the storage disk 65 leaves through openings 110 through 119 in the shroud surrounding the storage disk 65. The area inside the shroud is divided in four chambers: first and second chambers between storage disk 65 and secondary coupling disks 68 and 69 respectively. The airstream in the first and second chambers is directed substantially from the center to the outside. Chambers three and four are enclosed by the coupling disk 68 and shell 61, respectively coupling disk 69 and shell 62. Air flows in chambers three and four are directed from outside to the center. Openings 110 through 119 extend over all four chambers and serve as exits for air flow from chambers one and two, and as entry openings for air flow into chambers three and four. Secondary coupling disk 69 has openings 120 for passing air from chamber three to chamber 1. Secondary coupling disk 69 has equivalent openings to let air enter chamber two from chamber four. The flow of air into chambers three and four can be enhanced by giving magnetic pieces 72 a suitable form.

The thickness of the enclosure shells in the area of magnetic pieces 72 and 73 is small to provide close proximity between magnetic pieces of opposing primary and secondary coupling disks.

FIG. 10 is a top cross-sectional view of another storage module. Storage module 160 differs from the modules shown on FIGS. 5,6 and 7 by the transducer support means. Storage module 160 with storage disk 161 mounted between two flanges on shaft 163 may have a bearing arrangement as shown in FIG. 7 or the one shown on FIG. 9. Transducer 167 is mounted on arm 166 and connected to positioning arm 164. Positioning arm 164 turns around shaft 165 under control of the forces implied on positioning arm 164 from spring 168 and pushrod 180. If no force is implied on pushrod 180, spring 168 retracts positioning arm 164 into a position, where extension 169 hits set screw 170. Set screw 170 and extension 169 define the retract position of transducer 167. Set screw 170 is held in place by nut 173. Spring 181 is provided to ensure that pushrod 180 is always in contact with extension 185 of positioning arm 164.

Utility plate 190, consisting of a recess section for the pushrod 180-position shaft interface and a connector section. In the recess section there is a dust seal, consisting of a seal 183 and a cover plate 182. Seal 183 prevents dust from entering the interior of the storage module.

Transducer 167 is moving on an arc around the center of shaft 165. A second transducer may be connected to positioning arm 164 for reading or recording data signals on the lower surface of storage disk 161.

FIGS. 11 and 12 are illustrations of still another type of storage module. Storage disk 201 is clamped between flanges 202a and 202b. The assembly of storage disk 201 and flanges 202a and 202b is supported by bearings 204 and rotates around stationary shaft 203, which is held in openings of shells 200a and 200b. Transducer 206 and mounting flexure 207 are directly connected to pushrod 208. Ribs 222 of flange 202a provide for an air flow across the top surface of storage disk 201. Shield 223 of the upper enclosure shell 200a and shield 224 of the lower enclosure shell 200b protect transducer heads 206a and 206b from the direct air stream from impeller flange 202. The two enclosure shells 200a and 200b include the means for guiding pushrod 208; a guiding pin 209 moving in slots 210a and 210b prevents rotary movement around the axis of pushrod 208. Spring 211 retracts pushrod 208 if no force is exercised on the pushrod 208. Enclosure shells 200a and 200b provide two chambers 214 and 215 for the airflow. Chamber 214 receives airstream from the top and bottom surfaces of storage disk 201. Openings 232 and 233 above and below the guide of pushrod 208 allow the air to leave chamber 214 into 215. Chamber 215 is closed off by an air filter 216. Air filter 216 continuously collects particles contained in the air flow. The air reenters the circular flow from area 217. Flanges 222 are arranged in such a manner, that air is sucked into the center of the impeller through channel 218. Impellers 202a and 202b have a ringlike top closure, on which magnetic pieces 230 and 231 are mounted. Therefore flanges 202a and 202b serve as flange for holding storage disk 201, as impeller for providing an air flow, and as secondary coupling disk for rotating storage disk 201 when interfacing with a primary coupling disk.

FIGS. 13a, 13b and 13c are schematic illustrations of still another type of storage module of the present invention. The storage module of FIGS. 13a, 13b and 13c differs from those of the preceding FIGURES by the method of mounting the transducer support arm. A frame consisting of side bars 260 and 261 together with the end bars 258 and 259 is used to support flexures 255 and 257, carrying transducers 254 and 256 for reading or recording data on the upper side of storage disk 251. Shafts 262 and 263 connect the frame 260 with flexures 265 and 268. Flexure 265 supports shaft 262 and allows only movements in the direction of the axis of shaft 262. FIG. 13 is an illustration of the side view of flexure 265. Flexure 268 supports shaft 263, which in turn serves also as pushrod. Mounting of shafts 262 and 263 in flexures 265 and 268 is such that transducers 254 and 256 could operate on tracks in the center area of storage tracks, if no other force is applied to the frame. Spring 272, placed between the bottom of the recess 280 and a restraining washer 281 forces the frame to move into a position, from which transducer 256 could operate on the most outer track, and transducer 254 could operate on the most inner track of storage disk 251. When a force is applied on the pushrod by the positioning shaft of the module drive, the transducer 256 is moved towards the inner tracks, while transducer 254 is moved towards an outer track.

To prevent dust from entering the inside of storage module of FIG. 13, a seal 282 is placed from the inside over the recess of utility plate 270 and held in place by cap 283.

FIG. 14 is a cross-sectional view of a storage module with a different enclosure shell. The storage module hat two enclosure shell sections 121a and 121b, and a utility plate 143. Storage disk 122 is held between flanges 123 and 124 on shaft 125. Bearings 126 and 127 mount shaft 125 in the enclosure shells 121a and 121b. However, differing from the storage module of FIGS. 5 and 6, bearings 126 and 127 for shaft 125 are located between the storage disk 122 and secondary couplings disks 132 and 129 respectively. Secondary coupling disks 132 and 129 are affixed to shaft 125 by flanges 128 and 131 respectively. Flanges 123 and 124 include ribs to enhance air flow across the surfaces of storage disk 122. The air is supplied through openings 153 in shell 121a and openings 154 in shell 121b. A thin shield 145 covers the area 152 in which secondary coupling disk 132 rotates. Area 152 serves as plenum chamber for the air flow to the lower side surface of storage disk 122. A thin plate 146 covers the area 151 in which secondary coupling disk 129 rotates. Area 151 serves as plenum chamber for the air flow to the upper surface of storage disk 122. Area 151 receives air through openings 148; area 152 receives air through openings 149. The mounting and moving of transducers 135 and 134 is similar to the one shown and described with reference to FIGS. 7 and 8. Insert 143 includes the recess for holding pushrod 141 and also the connector for the electrical signals (not shown in FIG. 14).

The storage module of which FIG. 15 is a schematic illustration differs from the one shown on FIG. 9 in the method used to drive storage disk 400. All the storage modules shown on the preceding figures use magnetic coupling means for rotating the storage disk by a motor located in the module drive. The storage module shown in FIG. 15 has a friction wheel, which can be brought in contact with another friction wheel or a friction belt in the module drive. The external friction wheel 412 is protected by a cover 409, which is attached to the enclosure consisting of shells 407 and 408, the storage module by some screws, of which one screw 413 is shown. The penetration of shaft 403 through shell 407 requires extra precaution to prevent entering of dust into the enclosure. A filter 420 is placed over the openings 422 in the chamber wall 410. To inhibit dust particles from entering the area 425 of the rotating disk 400 from chamber 424. The lower chamber 426 does not require a particle filter, because the lower end of shaft 403 does not penetrate the lower enclosure shell 408, and electrical components required to perform special tasks on the storage module under control of signals issued by the data handling device. In the present invention the storage module is a storage device for data, which can be removed from the drive. The storage module of the present invention includes a storage disk and transducer means for reading or writing data on the storage disk. A simplified method of driving the storage disk reduces the cost of the storage module and the cost for storing data.

FIGS. 16 and 17 are top and side view illustrations of the drive assembly for a storage module with friction drive wheel. A baseplate 450 carries motor 452 with drive pully 453. Friction belt 456 is guided by pulleys 454 and 455. A pulley 457 on tension arm 458 provide sufficient tension to ensure that friction belt 456 remains operative. If a storage module is inserted in the slot of the module drive, its friction wheel 412 is pressed against the friction belt 456 as shown in FIG. 16 and reduces the slack in the friction belt 456 provided by the tension wheel 457. FIG. 17 is a side view of the arrangement.

FIGS. 18a, 18b, and 18c are cross-sectional views of still another type of storage module of the present invention. This storage module has a friction wheel interface for moving the transducer support arm. It requires a driving friction wheel in the drive unit to interface with the actuator.

The enclosure consists of a shell 500 and a cover plate 501. Shaft 502 is mounted in bearings 503 and 504 and carries storage disk 505 between flanges 506 and 507, as well as coupling disks 508 and 509. To ensure close proximity between the magnetic elements 510 respectively 511 and the magnetic elements of the driving coupling disks in the drive unit, shell 500 and cover plate 501 have circular recesses 512 and 513.

Transducers 515 and 516 are mounted on arms 517 and 518, respectively. Transducer support arms 517 and 518 are spaced apart by support block 520, which is clamped on metalband 521. The support block 520 can be moved by the metalband 521, so that the transducers can be can operate with any selected one of the storage tracks of storage disk 505. Metalband 521 is guided around rollers 523 and 524. The external drive wheel 526 of the drive unit is preloaded by a spring and presses against the metalband and the free roller 528 when the storage module is inserted in the drive unit. The recessed area into which drive wheel protrudes is closed of against the interior of the storage module by walls 531, 532, 533. The gaps through which metalband 521 passes into the interior of the storage module have suitable means preventing dust particles from entering the interior of the storage module.

The transducer support block and the attached transducers can be moved between two limiting positions. The first position is determined by the stop block 540, which includes also a spreader for unloading the transducers. Whenever support block is moved into the outside position, the transducers are unloaded, and cannot contact the surface of the storage disk. This is the restore position, to which the support block returns when the storage module is removed from the drive unit. This task is performed by spring 544 and the metalband 545, which is guided around wheel 547. The second limiting position is determined by the stop for the support block at the separation wall. This stop prevents the transducers from being moved into the flanges.

Instead of the plug/jack interface for the electrical signals of the transducers, this storage module has a plurality of recessed contact rails 550. The drive unit includes contact fingers, which glides along this rails while the module is inserted into the drive unit, thereby performing a wiping action and ensuring good contact.

FIG. 19 is an illustration of still another method of sealing the interior of the storage module against entry of particles through the opening for the pushrod in the enclosure. Pushrod 570 penetrates the enclosure 571 through opening 572. An elastic boot 573 with a washerlike endplate 575 is affixed to pushrod 570 by a screw 575. A pressure plate 576 and screws placed along the circle indicated by dashed lines 577 and 578 ensure a dustproof seal between boot 573 and enclosure 571.

In the arrangement of a storage module drive, including the drive motor for the storage disk and the actuator for the moving of the transducers, and a removable storage module, means have to be provided for proper alignment of the transducer with a desired storage track. Tolerances in the manufacturing process do not ensure, that a transducer is positioned with sufficient precision over a storage track.

FIG. 20 is an illustration of an arrangement which allows a fine adjustment of the transducer after the module has been inserted into a slot of the module drive. The actuator arm is hollow tube 600. A stepper motor 601 and a metal band 602 wound around drive wheel 610 are used to move actuator shaft 600 stepwise in a wellknown fashion. Actuator shaft 600 is supported in bearings (not shown) by posts 603 and 604. The positioning shaft 606 is movably mounted inside the actuator shaft 600. Actuator shaft 600 and positioning shaft 606 have matching threads 606 and 607. By rotating positioning shaft 606 inside actuator shaft 600 relative position of both arm to each other can be changed. In operation positioning shaft 606 interfaces with pushrod 610 of an inserted storage module. Operating the actuator positions the transducer. Reading the signals of the track next to the transducer will show if the signal generated in the transducer by the stored signal in the particular track can be read. If the signal is not of sufficient strength, the actuator arm is moved by actuator motor 601 to the retracted position, in which a motor 611 with coupling wheel 612 can rotate positioning shaft 606. Rotating positioning shaft 606 clockwise or counterclockwise effectively lengthens, respectively shortens the reach of actuator shaft 600. Repositioning the transducer to the desired position allows to recheck signal strength. Checking signal strength and changing the position of positioning shaft 606 relative to actuator shaft 600 is repeated until an alignment of the transducer with a desired storage track on the storage disk of the inserted storage module is achieved.

FIGS. 21a, 21b, and 21c are illustrations of still another embodiment of the present invention. The enclosure of the storage module consist of the shell 750 and the cover 751. Storage disk 752 is mounted between flanges 753a nad 753b on shaft 754. Shaft 754 is supported by bearings 755a and 755b in shell 750, respectively 751. A transducer 756, mounted in a flexure 757 and attached to transducer support arm 758 is used to read or write data in storage tracks of the upper surface of storage disk 752. There is another transducer attached to support arm 758 for reading or writing data in storage tracks of the lower surface of storage disk 752. Transducer support arm 758 is moveably mounted on shaft 759. A band 760 is provided to return transducer support arm 758 to a rest position, in which the transducers are unloaded by spreading the flexures on ramp 762. Transducer support arm 758 has two attachements, a metal band for interfacing with the friction wheel of the actuator drive wheel, and a position reading grid. Drive wheel 763 of the actuator in module drive 766 presses against band 764 and pressure roller 765. Rotating friction wheel 763 under control of an actuator causes transducer support arm 758 to move along shaft 759. The position reading means for the transducer support arm 758 consists of a grid 767, attached to the support arm 758, a light source 768, a light sensor 769 and a multifiber light guide 770, light guide 770 is attached to the enclosure of the storage module 751. Light source 768 and light sensor 769 may be attached to enclosure shell 750, as shown in FIG. 21b, and require electrical connections to the storage drive, or may be mounted on a carrier connected to the storage drive which reaches into the storage module when the storage module is inserted in the storage drive. The cross-section of light guide 770 covers several bands of grid 767. Receiving a number of light beams from light source 768 through grid 767, light guide 770 guides these beams to another area of grid 767. The beams exit guide 770 and pass through grid 767 if they encounter a transparent stripe. Light sensor 769 measures the intensity and generates equivalent signals, which are used to count the number of storage tracks traversed during the movement of the transducer support arm 758. As indicated for four relative positions of light guide 770 to grid 767 the sensor 768 detects a change in intensity from dark (D) to light (L) or light to dark for a relative movement by half a band of the grid. A black area of grid 767 representing an opaque band of grid 767, the white area representing a transparent band of grid 767. FIG. 22a is a more detailed illustration of the arrangement for determining the movement of the transducer support arm 758. The orientation of the fibers within light guide 770 is such, that light emitted by source 768 and entering guide 770 on the outerside will be carried by fibers on the outerside and pass through transparent stripes of grid 767 to sensor 769. FIG. 22b is an illustration of the movement between light guide 770, light source 768, and light sensor 769 relative to grid 767. The three different light beams 780, 781, and 782, generated by the light source 768 and the transparent stripes of grid 767, pass through guide 770 and appear at the end of guide 770 as light beams 783, 784, and 785. Resulting from the relative movement of guide 770 to grid 767, light beams 783, 784, and 785 move with double that speed relative to grid 767. Light sensor 769 will detect light and dark areas, whereby during movement of the guide 770 along grid 767 there will a dark area occur every time guide 770 passes one transparent or opaque stripe.

The storage module of FIGS. 21a, 21b and 21c has an opening, which allows the friction wheel 763 of module drive 766 to access band 764. This opening is closed by doors 771a and 771b. Module drive 766 has two guides 772a and 772b, which opens doors 711a and 711b while the storage module is inserted into module drive 766. Guide 772a has a plurality of contact fingers 773, which slide along contact rails 774 of the storage module. These contact fingers 773 and contact rails 774 make the electrical connection between the electronic components in the storage module and the controlling and sensing electronic means in the storage drive 766.

FIG. 9 is a schematic diagram of the major components of a control and drive arrangement for positioning a transducer over a desired storage track for reading or writing data in the storage track. The address of the storage track is entered by the host via an data input 801 into the address register 802. The comparator 804 compares the actual address stored in address counter 803 and supplied via line 805 to the comparator 804 with the desired address value, stored in address register 802 and supplied to comparator 804 via line 806. The result of the comparison exits comparator 804 on line 807 and is fed to the positioning means 809. Depending on the comparison, showing the desired address value being higher, equal or lower than the actual address value, the positioning drive will move the transducer and the grid 811, which is connected to the transducer support means to a more inner track, let the transducers remain in position, or move the transducer to a more outer storage track. Address counter 803 receives during movement of the transducer support means pulses proportional to incremental movement of the grid. These pulses are generated by a photosensor 815, which receives light pulses generated by the light source 813, grid 814 and light guide 815 and fed to the address counter 803 via line 817. Counter 803 receives a control signal from comparator 804 via line 812 to determined the direction of count, counting up for movement of the transducer towards an inner track, counting down for a movement of the transducer towards an outer track. The control and drive arrangement may be complemented by a fine positioning control and means to switch between a coarse positioning operation and a fine postioning operation.

FIG. 23 is a schematic illustration of a stationary driving arrangement for the storage modules. The coils 902 through 909 are used to generate a rotary magnetic field and are mounted in a circular arrangement in the location of the first coupling disk in the storage drive, close to the secondary coupling disk of a storage module when it is inserted in a slot of the storage drive. clock oscillator 901, which generates 8 signals S1-S8. The eight signals have a predetermined timed relationship to each other. Each of the signals is supplied to one of the coils with magnetic cores 902 through 909 to generate a magnetic field. The timewise sequential fields represent a rotary magnetic field, similar to the one generated by a plurality of magnets on a rotating disk. The secondary coupling disk 910 of a storage module will follow the rotating field and cause the storage disk to rotate at a speed determined by the frequency of the signals supplied to the coils.

In the above description various implementations of the present invention are disclosed with reference to numerous FIGURES. Several different arrangements of the storage disk and secondary coupling disks have been discussed. Various methods of sealing the interior of the storage module are presented. Different transducer support arms are shown.

What I claim is:

1. A storing device for signals representing data, comprising in combination
    a removeable storage module including
        a sealed enclosure for enclosing a shaft mounted inside said enclosure,
        a storage disk mounted on said shaft, having a plurality of storage tracks for storing data,
        transducer means for reading or writing data in said storage tracks,
        positioning means including
            transducer support means for moving said transducer means to a selected one of said storage tracks;
        a magnetic coupling disk mounted on said shaft and concentrically connected to said storage disk;
        said enclosure providing a magnetic field permeable cover over said magnetic coupling disk;
    and a storage module drive including
        means for receiving said storage module,
        means for rotating said storage disk in said enclosure including
            means for generating a rotating magnetic field, said field permeating said cover and providing motive force for rotating said magnetic coupling disk and said storage disk of said storage module;
        and actuator means for operating said positioning means inside said enclosure.

2. A storage device for signals representing data as claimed in claim 1 wherein said means for generating a rotating magnetic field include
    a drive motor,
    a disk coupled to said drive motor,
    first magnetic elements attached to said disk;
    and wherein said storage module further including secondary elements mounted on said magnetic coupling disk, said primary magnetic elements and said secondary magnetic elements constituting a magnetic coupling between said drive motor and said shaft.

3. A storing device for signals as claimed in claim 1 wherein said sealed enclosure include a shroud surrounding said storage disk, thereby dividing the interior of said sealed enclosure into a first and a second plenum chamber located on both sides of said storage disk, the area of the storage disk and a prechamber;
    each of said plenum chambers having first openings connecting said plenum chamber to the area inside said shroud and second openings for connecting said plenum chamber with said prechamber;
    said shroud having third openings connecting said inside of said shroud with the area outside said shroud;
    said first and second and third openings providing a passage for recirculating air from said prechamber.

4. A storing device for signals as claimed in claim 1, wherein said positioning means include
    a pivot shaft;
    second bearing means for moveably mounting said transducer support means on said pivot shaft;
    an adjustable stop;
    and a spring for preloading said support arm against said adjustable stop;
    a push rod for moving said support arm from said stop towards the center of said storage disk under control of said first or second actuator means.

5. A storing device as claimed in claim 1, wherein said transducer support means include
    a rectangular frame;
    first and second bearing means extending from each of the short sides of said rectangular frame;
    flexures for receiving said bearing means affixed to said first enclosing means and providing linear motion capability to said frame for moving said transducers between the inner and the outer tracks of said storage disk;
    said first bearing means further including a pushrod protruding through an opening in said first enclosure for interfacing with said first or second actuator means;
    and wherein said transducer means include two sets of transducers,
    each of said sets of transducers connected to one of the short sides of said rectangular frame.

6. A storing device as claimed in claim 1, wherein said module drive including means for adjusting said actuator means to said positioning means in said storage module, said actuator means including a first and a second actuator shaft;

said means for adjusting including interconnecting means for linking said first actuator shaft to said second actuator shaft for a determined extension of said secondary actuator arm towards said positioning means.

7. A storing device as claimed in claim 6, wherein said storage module drive including means for adjusting said actuator means arm to said positioning means in said storage module, said means for adjusting including a hollow actuator shaft and a positioning shaft, mounted in said hollow actuator shaft;

said hollow actuator shaft and said positioning shaft having matching threads, whereby the position of said positioning shaft inside the hollow actuator shaft can be changed by rotating said positioning shaft inside said hollow actuator shaft, thereby adjusting the extension of said positioning shaft from said actuator shaft;

means for rotating said positioning shaft when positioned in a predetermined position.

8. A storing device for signals as claimed in claim 1, wherein said positioning means further include means for retracting said transducer support means to a predetermined retract position, and means for unloading said transducer means when said transducer support means are in said retract position.

9. A storing device for signals as claimed in claim 1 wherein said positioning means include:

an optical grid for determining movement of said positioning means, and a multifiber light guide;

said storage module drive having means for detecting movement of said positioning means, including a light source, a light sensor;

said light source and said light sensor mounted next to each other, and said light guide receiving light from said light source through said optical grid of said storage module and emitting said received light in the direction of said light sensor, said light sensor receiving said emitted light through said optical grid, said grid modulating said light travelling from said light source to said light guide and said emitted light travelling from said light guide to said light sensor, whereby said light sensor detects sequences of high intensity and low intensity while the positioning means are moved by said actuator means.

* * * * *